United States Patent [19]
David et al.

[11] Patent Number: 5,885,504
[45] Date of Patent: Mar. 23, 1999

[54] PROCESS FOR MOULDING HIGH STRENGTH ELONGATED PARTS MADE OF A FIBRE-RESIN COMPOSITE

[75] Inventors: Laurent Jean Pierre David, Saint Germain les Corbeil; Daniel Georges Girault, Melun; Christophe Gerard Grosbois, Combs la Ville, all of France

[73] Assignee: Societe Nationale D'Etude et de Construction de Moteurs D'Aviation "Snecma", Paris, France

[21] Appl. No.: 736,719

[22] Filed: Oct. 25, 1996

[30] Foreign Application Priority Data

Oct. 25, 1995 [FR] France .................... 95.12562

[51] Int. Cl.⁶ .......................... B29C 45/14; B29C 45/73; B29C 70/68
[52] U.S. Cl. ............ 264/257; 264/327; 264/328.16
[58] Field of Search ............... 264/327, 328.16, 264/257; 425/384, 407, 129.1, 548

[56] References Cited

U.S. PATENT DOCUMENTS

| | | |
|---|---|---|
| H559 | 12/1988 | Brown . |
| 4,338,068 | 7/1982 | Suh et al. . |
| 4,784,814 | 11/1988 | Diethelm et al. . |
| 4,889,668 | 12/1989 | Kemp ........................ 264/257 |
| 4,940,563 | 7/1990 | Kromrey .................. 264/257 |
| 5,110,514 | 5/1992 | Soane ........................ 264/22 |
| 5,306,448 | 4/1994 | Kromrey .................. 264/257 |
| 5,413,661 | 5/1995 | Spengler et al. ......... 264/257 |

FOREIGN PATENT DOCUMENTS

| | | |
|---|---|---|
| 0 294 768 | 12/1988 | European Pat. Off. . |
| 0 533 418 A1 | 3/1993 | European Pat. Off. . |
| 0 611 641 A1 | 8/1994 | European Pat. Off. . |
| 0134497 | 3/1979 | Germany ................... 264/327 |

OTHER PUBLICATIONS

Patent Abstracts of Japan, vol. 11, No. 123 (M–581), Apr. 17, 1987, JP–61–263714, Nov. 21, 1986.

Patent Abstracts of Japan, vol. 13, No. 512 (M–893), Nov. 16, 1989, JP–1–206009, Aug. 18, 1989.

*Primary Examiner*—Leo B. Tentoni
*Attorney, Agent, or Firm*—Oblon, Spivak, McClelland, Maier & Neustadt, P.C.

[57] ABSTRACT

A process for moulding high strength elongated parts made of a fibre-resin composite material, especially turbomachine blades such as fan blades, is disclosed wherein a plurality of heating and cooling elements are arranged within the body of the mould at intervals along the length of the mould cavity, and the liquid resin which is injected at one end into the mould cavity containing the fibre preform is polymerized progressively from the opposite end of the mould cavity, while maintaining the supply of liquid resin under pressure to the cavity, by successively de-activating the cooling elements, which maintain the resin in the liquid state, at predetermined time intervals starting from said opposite end of the mould cavity and progressing in turn towards said one end, and in synchronism therewith successively activating the heating elements to raise the temperature of the resin to the polymerizing temperature progressing in turn from said opposite end to said one end of the mould cavity. The process enables shrink cavities in the finished part to be avoided.

4 Claims, 2 Drawing Sheets

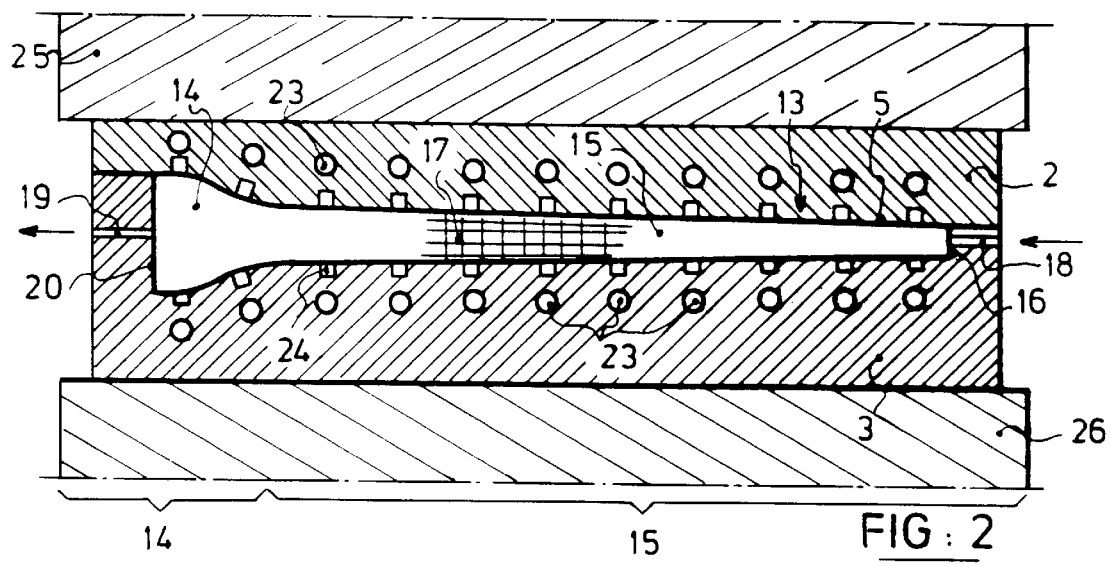
FIG: 2
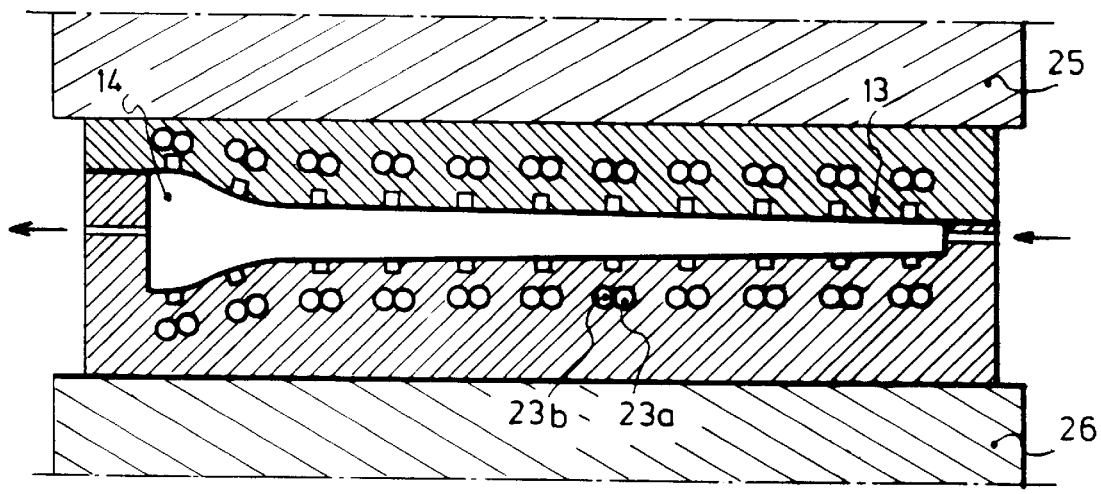
FIG: 3
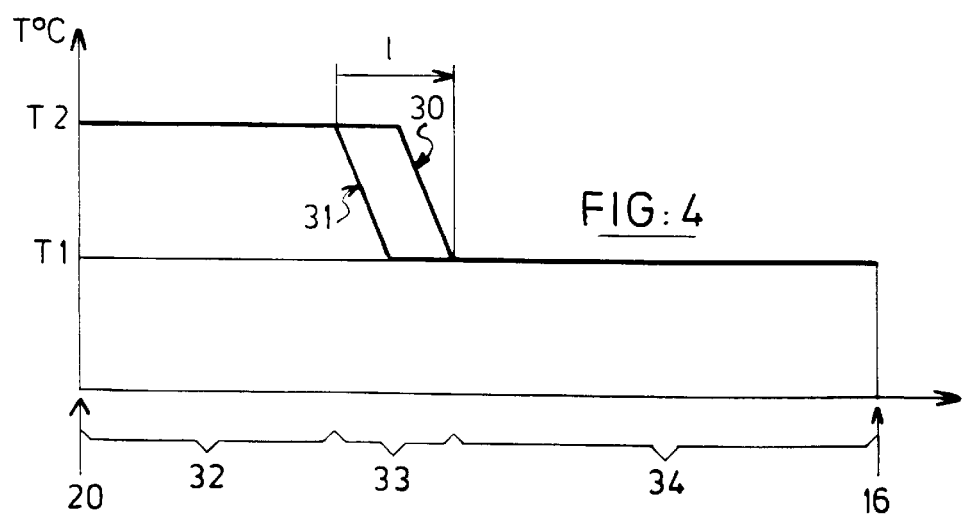
FIG: 4

PROCESS FOR MOULDING HIGH STRENGTH ELONGATED PARTS MADE OF A FIBRE-RESIN COMPOSITE

BACKGROUND OF THE INVENTION

1. Field of the Invention

The invention relates to a process for moulding high strength elongated parts from a fibre-resin composite material, and is particularly, but not exclusively, applicable to the manufacture of turbomachine blades, such as fan blades.

2. Summary of the Prior Art

The RTM (resin transfer moulding) process is used, particularly in aeronautics, to produce parts made of an organic resin-fibre composite material with a high strength to mass ratio, and comprises the following basic steps:

a) making a fibre preform to the shape of the finished part;
b) placing the preform in a mould;
c) injecting liquid resin into the mould; and
d) maintaining the resin under pressure while polymerizing the resin by heating.

The resins used are very fluid and penetrate satisfactorily between the fibres of the preform, even when injected at a relatively low pressure. During polymerization under the action of heat, the resin changes in turn from the liquid state to a gelled state, and then to a solid state. However, these resins suffer from a 4% to 8% volume reduction during the gelling phase, which leads to the development of shrink cavities, i.e. localized absences of material within the finished part.

When the temperature of the part is homogeneous, the surface of the part becomes rough, as the hotter interior of the part polymerizes first and attracts resin which is still liquid from the surface. However, with more bulky parts the bulkier portions heat up and polymerize more rapidly as a consequence of the fact that the polymerization reaction is exothermic, and the heat thus produced dissipates more slowly. Shrink cavities then tend to form in the colder portions, which polymerize last and hence feed the hotter portions with liquid resin. This phenomenon is particularly inconvenient in the case of turbomachine blades, the aerofoil portion of which has a long thin trailing edge in which the shrink cavities tend to form.

It is known to equip the mould with both heating elements and cooling elements to warm the colder portions and cool the hotter portions during polymerization. However, such systems are very difficult to regulate, and are not very effective when the part has substantial amounts of mass in localized areas. Moreover, they do not solve the surface roughness problems.

It is known, from the publication of the statutory invention registration US-H559 dated 6th Dec., 1988, to carry out moulding in a flexible envelope, the method consisting of creating and shifting a gelling front in the part by pressing the part between two plates, one of which is heated and the other cooled, and subsequently progressively heating the cooled plate to the polymerization temperature of the part to shift the gelling front. However, this process is reserved for thin parts of uniform thickness, and it is intended as a means for facilitating the evacuation of the volatile components evolving from the polymerization, and not for resorbing the shrink cavities. Moreover, it does not allow precise dimensioning in terms of thickness.

SUMMARY OF THE INVENTION

It is an object of the invention to overcome the problems associated with the known methods as discussed above, and to this end the invention provides a process for producing a high strength elongated part made of an organic resin-fibre composite material, said process comprising the steps of:

providing a mould defining a mould cavity having the shape of the part to be produced, said mould including a succession of heating and cooling elements spaced apart between opposite ends of said mould cavity in the longitudinal direction thereof;

making a fibre preform;

placing said fibre preform in said mould cavity;

activating said cooling elements;

injecting liquid resin into said mould cavity and maintaining a supply of said liquid resin under pressure to said mould cavity at one end thereof;

successively de-activating said cooling elements at predetermined time intervals starting from the end of said mould cavity opposite said one end and progressing in turn towards said one end; and successively activating said heating elements starting from said opposite end of said mould cavity and progressing in turn towards said one end substantially in synchronism with said successive de-activation of said cooling elements;

whereby said heating elements raise the temperature of the resin in said mould cavity to the polymerization temperature of said resin progressively towards said one end of said mould cavity and said cooling elements prevent the liquid resin in advance of the gelling front of the polymerizing resin from polymerizing prematurely.

It will be appreciated that the successive, gradual activation of the heating elements creates and moves a gelling front which travels along the part from the end furthest from the end to which the liquid resin is supplied until the latter end is reached. In this front, the resin changes from the liquid state to the gelled state, while remaining in contact with the pressurized liquid resin in advance of the front, said liquid resin thus filling the gaps created as the resin gells. The surface of the finished part is therefore smooth, and the shrink cavities no longer manifest themselves at the end of the part.

The rate of movement of the gelling front will preferably be slow, for two reasons:

the resorption of shrink cavities is improved when the front is narrow, and only a limited amount of material can be gelled at one and the same time, because of the rate of flow of pressurized resin through the preform to replenish the resin at the gelling front is restricted by the viscosity of the resin.

As the activation of the heating elements progresses and the gelling front advances, the cooling elements are still active in advance of the front and act to absorb the heat which is transmitted by thermoconduction to the liquid resin upstream of the front. This prevents a premature rise of temperature in this region which would otherwise lead to inception of polymerization and a resulting increase in viscosity detrimental to the flow of resin and the satisfactory supply of the resin to the gelling front. In other words, this cooling permits the width of the gelling front to be reduced and enables the liquid resin closest to the resin undergoing polymerization to fill the shrink cavities better in the course of their formation. It also enables the replenishment of the resin to be carried out without difficulty between the fibres of the preform and at a low pressure, which reduces the danger of settling of the preform and also reduces the hydrostatic pressure exerted by the liquid resin on the walls of the mould, thereby reducing the force tending to open the mould and which can assume high values in the case of large-size parts such as turbomachine fan blades.

Preferred features and other advantages of the invention will become apparent from the following description of the preferred embodiments, given by way of example only, with reference to the attached drawings.

BRIEF DESCRIPTION OF THE DRAWINGS

FIG. 2 is a longitudinal section through a mould illustrating the moulding of a similar blade in one embodiment of the process in accordance with the invention;

FIG. 3 is a view similar to FIG. 2 but illustrating the moulding of a blade in an alternative embodiment of the invention;

FIG. 4 is a diagram illustrating the formation of the gelling front in a moulding process in accordance with the invention.

DESCRIPTION OF THE PREFERRED EMBODIMENTS

Figure 1:
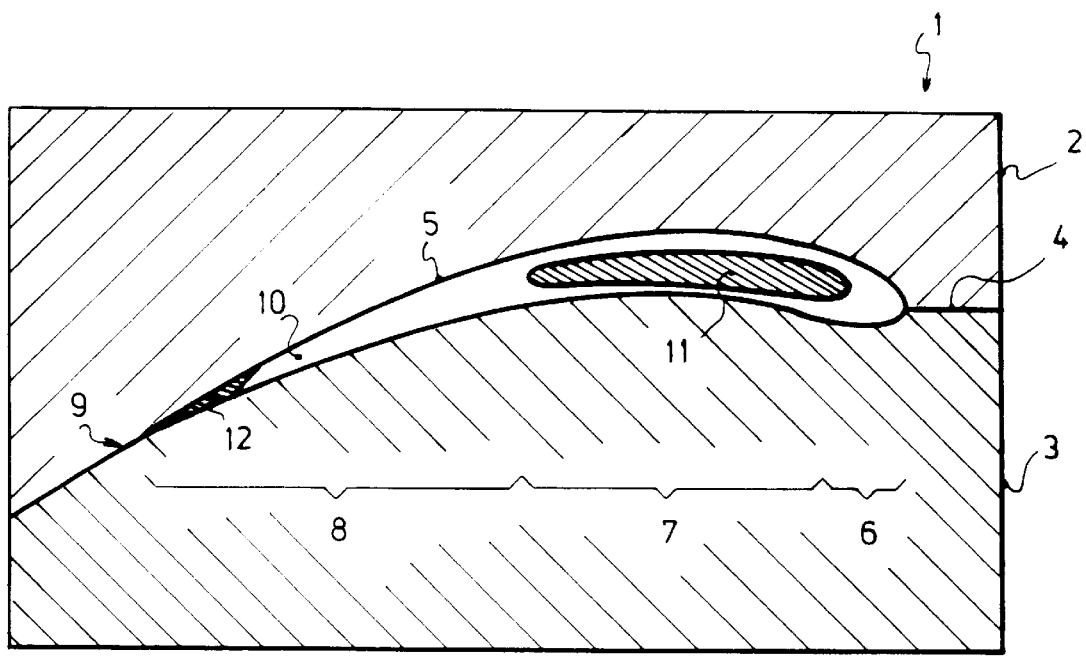
FIG. 1 is a transverse section through a mould illustrating the development of shrink cavities in the trailing edge of a blade using a known moulding process.

FIG. 1 shows a mould 1 formed by two parts 2 and 3 which separate at a joining surface 4 and define a mould cavity 5 having the shape of the blade which is to be moulded, the drawing showing a transverse cross-section through the vane portion of the blade. This vane portion has, from front to back, a leading edge 6, a body 7 and a trailing edge 8. The leading edge 6 is rounded, the body 7 is the thickest part, and the trailing edge 8 tapers towards its end 9.

In this prior art process the mould 1 is heated so as to bring the resin 10 injected into the cavity 5 progressively to its polymerization temperature. The reaction is exothermic and causes additional heating in the body 7 and towards the thicker leading edge 6, this heating itself bringing about polymerization and the accelerated gelling of a mass 11 of the resin, this mass 11 having a tendency to fix the still liquid resin 10 which surrounds it. As this gelling is accompanied by a reduction of volume of from 4 to 8% depending on the resin used, the resin 10 in the trailing edge region 8 moves towards the mass 11, which brings about the formation of shrink cavities 12 towards the end 9.

Were the temperature of the trailing edge 9 to be raised, the development of shrink cavities 12 would be reduced, but it would not be possible to prevent the migration of the liquid resin from the surface of the part towards the mass undergoing gelling inside the part, and, as a consequence, the surface would become rough.

Moreover, as the dissipation of heat is poor in the thick regions, polymerization produces a rise of temperature which, itself, speeds up polymerization, thus creating an unstable process which is difficult to control by the introduction of heat or cold from the outside.

An embodiment of the moulding process in accordance with the invention will now be described with reference to FIG. 2. The blade 13 to be formed is shown inside the mould 1 in its longitudinal direction and includes a thick dovetailed root 14 and a vane 15 thinning towards its tip.

After the reinforcement fibre preform, partly shown at 17, has been placed inside the mould 1, the resin is injected through at least one passage 18 opening into the mould cavity 5 at the tip end 16, and, at the same time, air is exhausted through at least one passage 19 leading from the root end 20 of the mould cavity opposite the end 16 and also serving to exhaust any excess resin from the cavity 5.

The mould 1 includes a plurality of ducts 23 spaced apart in the body of the mould between the ends 20 and 16 of the mould cavity 5, i.e. outwardly of the mould cavity and in the vicinity of the walls of the cavity. Each duct 23 is arranged to carry either a hot or cold heat conducting fluid, and preferably the flow and the temperature of the fluid will be regulated for each duct by means of a regulation system in response to a reference temperature and information supplied by a temperature sensor 24 placed near the wall of the mould cavity 5 in the vicinity of the duct 23. The assembly constituted by the ducts 23, the fluid, and the regulation system is designed so as to maintain the resin at the level of each duct 23 either at a temperature T1 at which the resin will remain liquid or at a temperature T2 at which the resin undergoes polymerization.

Preferably, in order to reduce the capacity of the fluid ducts 23 and their temperature regulation system, the mould 1 is clamped between the plates 25 and 26 of a heating press, the temperature of these plates being set at a value Tm close to T1 and T2, with Tm preferably equal to T1. This enables the amount of heat to be conveyed, and therefore the flow of heat-conducting fluid, to be reduced since only the differences of temperature T1-Tm and T2-Tm need to be maintained thus allowing more precise temperature regulation.

During the injection of resin, the ducts 23 carry cooling fluid to maintain the temperature of the resin at T1. Polymerization is then carried out as follows while maintaining the supply of liquid resin under pressure to the inlet passage 18 at the end 16 of the mould:

a) the duct 23 closest to the end 20 of the mould opposite the end 16 is switched to carrying heating fluid at the temperature T2; and b) the remaining ducts 23 are then switched one by one to carrying heating fluid at temperature T2 progressing gradually towards the end 16 at predetermined time intervals, the ducts 23 switched to T2 being kept at this temperature, and the ducts 23 not yet switched being kept at T1.

When all the ducts 23 have been heated to T2, they are kept at this temperature while the polymerization of the resin continues until the resin at the end 16 has polymerized completely.

The supply of pressurized liquid resin to the end 16 via the passage 18 is maintained from the time the first duct 23 at the end 20 is switched to temperature T2 until the resin has gelled at the other end 16.

With reference now to FIG. 4, the abscissa represents the length of the blade 13 between the ends 20 and 16 of the mould cavity, and the ordinate represents temperature T, T1 being the temperature at which the liquid resin is maintained to keep it in the liquid state, and T2 being the polymerization temperature of the resin. The curve 30 indicates the distribution at a particular moment of the temperature T of the resin between the ends 20 and 16 of the blade in the mould, and the curve 31 indicates the state of the resin, i.e., liquid at T1, and gelling, followed by solidification after a certain time, at T2.

Moving from the end 20 to the injection end 16, three stages of the resin are observed in turn:

a gelled or solid phase 32 at temperature T2 wherein the curves 30 and 31 have merged;

a gelling phase or gelling front 33 wherein the curves 30 and 31 are separate, the curve 30 representing the start of gelling, and the curve 31 the end of gelling; and, a liquid-phase 34.

As the temperature of successive ducts 23 is raised from T1 to T2, the gelling front 33 moves from the end 20 to the end 16 at a rate V. This front has a width L given by the expression $$L=V(t1+t2)$$

wherein t1 is the time for the temperature to rise from T1 to T2, and t2 is the polymerization time.

The width L of the front will be reduced by reducing the rate V of the advance of the front, thus increasing the time interval between the rise to T2 of two successive ducts 23, and vice versa. It will be appreciated that when L is low, the gaps created by the gelled resin are easily filled by the pressurized liquid resin which will then polymerize and enable a homogenous block of material to be obtained.

The skilled person will determine, by way of a few simple tests at different rates, the rate V giving the required quality of material, t1 and t2 depending upon the thickness of the part and the nature of the resin, thus being able to be assimilated with constants. It will be noted that the cooling of the liquid phase 34 by means of the ducts 23 which still carry cooling fluid at the regulated temperature T1 prevents the heating up of the said liquid phase 34 by transfer of heat from the front 33. This provides two advantages:

a) the front 33 is not widened; and b) the resin of the liquid phase 34 does not begin to polymerize, and thus remains very fluid so that it flows easily between the fibres of the preform 17 to supply the front 33 and fill the gaps created as the resin gels, which improves still further the quality of the product.

Another advantage of the process is that, even at a high rate of advance V, the shrink cavities are not concentrated in the cold end 16 of the part 13.

It will be noted that in this embodiment the ducts 23 each form both heating and cooling elements. However, it will be appreciated that these functions can be performed equally well by separate, specialized ducts, i.e. by a combination of separate heating ducts 23a and cooling ducts 23b as illustrated in FIG. 3, or by a mixed system (not shown) combining electrical heating elements with cooling ducts.

As a further modification, the temperature sensors 24 may be placed in the ducts 23 inside or at the outlet of the mould 1. This less costly solution, however, is less precise and demands a permanent and sufficient flow of fluid in the ducts 23.

We claim:

1. process for producing a part made of resin and a fiber preform, comprising the steps of:

providing a mold in which a mold cavity is formed, said mold including heating elements successively arranged between one end of said mold cavity and an opposite end of said mold cavity along a longitudinal direction of said mold cavity, and including cooling elements successively arranged between said one end of said mold cavity and said opposite end of said mold cavity along said longitudinal direction of said mold cavity;

making a fiber preform;

placing said fiber preform in said mold cavity;

injecting liquid resin into said mold cavity from said one end of said mold cavity and maintaining a supply of the liquid resin under pressure to said mold cavity;

activating said cooling elements to maintain a temperature of the liquid resin between said one end and said opposite end in said mold cavity at a first temperature below a polymerization temperature of the liquid resin at which the liquid resin starts to polymerize;

sequentially deactivating said cooling elements from said opposite end of said mold cavity toward said one end of said mold cavity; and sequentially activating, with said deactivating of said cooling elements, said heating elements from said opposite end of said cavity toward said one end of said mold cavity, wherein said step of sequentially activating said heating elements progressively raises the first temperature of the liquid resin in said mold cavity equal to or above said polymerization temperature of said liquid resin in a direction towards said one end of said mold cavity to create an advancing gel-front in said liquid resin, said cooling elements preventing said liquid resin in advance of said gel-front from polymerizing prematurely.

2. A process for producing a part made of resin and a fiber preform, comprising the steps of:

providing a mold in which a mold cavity is formed, said mold including heating/cooling ducts successively arranged between one end of said mold cavity and an opposite end of said cavity along a longitudinal direction in said mold cavity;

making a fiber preform;

placing said fiber preform in said mold cavity injecting liquid resin into said mold cavity from said one end of said mold cavity and maintaining a supply Y of the liquid resin under pressure to said mold cavity;

activating said heating/cooling ducts by supplying a cooling liquid to said heating/cooling ducts to maintain a temperature of the liquid resin between said one end and said opposite end in said mold cavity at a first temperature below a polymerization temperature of the liquid resin at which the liquid resin starts to polymerize:

sequentially switching said cooling liquid in each of said heating/cooling ducts to a heating liquid starting from said opposite end of said mold cavity toward said one end of said mold cavity;

wherein said step of sequentially switching said cooling liquid in each of said heating/cooling ducts progressively raises the first temperature of the liquid resin in said mold cavity equal to or above said polymerization temperature of said liquid resin in a direction towards said one end of said mold cavity to create an advancing gel-front in said liquid resin, said cooling liquid in said heating/cooling ducts preventing said liquid resin in advance of said gel-front from polymerizing prematurely.

3. The process according to claim 1, wherein said heating elements comprise first ducts and said cooling elements comprise second ducts, said activating of said heating elements includes supplying a heating liquid to said first ducts, and said activating of said cooling elements includes supplying a cooling liquid to said second ducts.

4. The process according to claim 1, further comprising a step of:

providing a heating press having plates between which said mold is placed.

* * * * *

UNITED STATES PATENT AND TRADEMARK OFFICE
CERTIFICATE OF CORRECTION

PATENT NO. : 5,885,504

DATED : MARCH 23, 1999

INVENTOR(S): Laurent J. P. DAVID, et al.

It is certified that an error appears in the above-identified patent and that said Letters Patent is hereby corrected as shown below:

Column 6, line 32, delete "Y".

Signed and Sealed this

First Day of August, 2000

Attest:

Q. TODD DICKINSON

*Attesting Officer*  *Director of Patents and Trademarks*